(12) United States Patent
Mehta et al.

(10) Patent No.: US 8,433,253 B2
(45) Date of Patent: Apr. 30, 2013

(54) VOLTAGE TUNED VARIABLE JAMMER TOLERANCE

(75) Inventors: Rish Mehta, Castro Valley, CA (US); Issy Kipnis, Berkeley, CA (US)

(73) Assignee: Intel Corporation, Santa Clara, CA (US)

( * ) Notice: Subject to any disclaimer, the term of this patent is extended or adjusted under 35 U.S.C. 154(b) by 1720 days.

(21) Appl. No.: 11/763,300

(22) Filed: Jun. 14, 2007

(65) Prior Publication Data
US 2012/0249301 A1 Oct. 4, 2012

(51) Int. Cl.
*H04B 1/38* (2006.01)
(52) U.S. Cl.
USPC ...... 455/73; 455/226.1; 455/63.1; 455/67.11; 455/296; 455/70; 375/295; 340/10.1; 340/572.1; 340/572.2; 340/10.2
(58) Field of Classification Search ............... 455/226.1, 455/63.1, 67.11, 296, 1, 70; 375/295; 340/10.1, 340/572.1, 572.2, 10.2
See application file for complete search history.

(56) References Cited

U.S. PATENT DOCUMENTS

| 7,155,172 | B2 * | 12/2006 | Scott | 455/70 |
| 7,579,953 | B2 * | 8/2009 | Chiu | 340/572.2 |
| 7,684,751 | B2 * | 3/2010 | Posamentier | 455/1 |
| 7,949,306 | B2 * | 5/2011 | Shah | 455/67.13 |
| 2003/0148748 | A1 * | 8/2003 | Shah | 455/296 |
| 2005/0159124 | A1 * | 7/2005 | Shah | 455/226.1 |
| 2007/0206701 | A1 * | 9/2007 | Paley et al. | 375/295 |
| 2008/0081551 | A1 * | 4/2008 | Posamentier | 455/1 |
| 2008/0150689 | A1 * | 6/2008 | Chiu et al. | 340/10.1 |
| 2008/0293352 | A1 * | 11/2008 | Posamentier | 455/1 |
| 2008/0297321 | A1 * | 12/2008 | Chiu | 340/10.2 |

* cited by examiner

*Primary Examiner* — April G Gonzales
(74) *Attorney, Agent, or Firm* — Cool Patent, P.C.; Kenneth J. Cool; Joseph P. Curtin

(57) ABSTRACT

Briefly, in accordance with one or more embodiments, a mixer circuit at a receiver of an RFID interrogator may operate at a power supply voltage selected based at least in part on a power level of the self-jammer signal. The mixer circuit may operate at a higher power supply voltage if the expected power level of the self-jammer signal is higher, and may operate at a lower power supply voltage if the expected power level of the self-jammer signal is lower.

20 Claims, 2 Drawing Sheets

VOLTAGE TUNED VARIABLE JAMMER TOLERANCE

BACKGROUND

Figure 1:
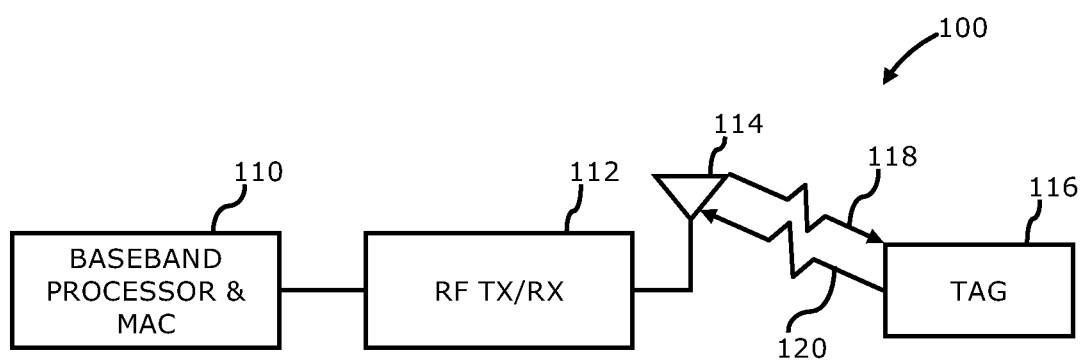

Radio-frequency identification (RFID) interrogators that conform to the International Organization for Standardization (ISO) ISO-18000-6C specification are unique in that they both transmit and receive simultaneously and on the same frequency. Many of these interrogators transmit and receive via a single antenna port. In such an RFID interrogator, some of the power from the transmitter reflects back to the receiver due to the practical antenna mismatch which may adversely affect the performance of the receiver portion of the RFID interrogator. For example, most RFID interrogators transmit +30 dBm (1 W) of output power. Even if an antenna has a respectable reflection loss of 15 dB, the receiver will need to tolerate a reflected power of +15 dBm. In order to tolerate this self-jammer, certain considerations may be provided for in the receiver front end that allow the system to tolerate such reflections. In order for the receiver to tolerate such high input signal levels of the self-jammer signal, the receiver typically utilizes a supply voltage of +5 V or greater. Many RFID interrogators, however, do not have an available +5 V supply, and/or may operate at a lower power, such as portable, handheld RFID interrogators.

DESCRIPTION OF THE DRAWING FIGURES

Figure 2:
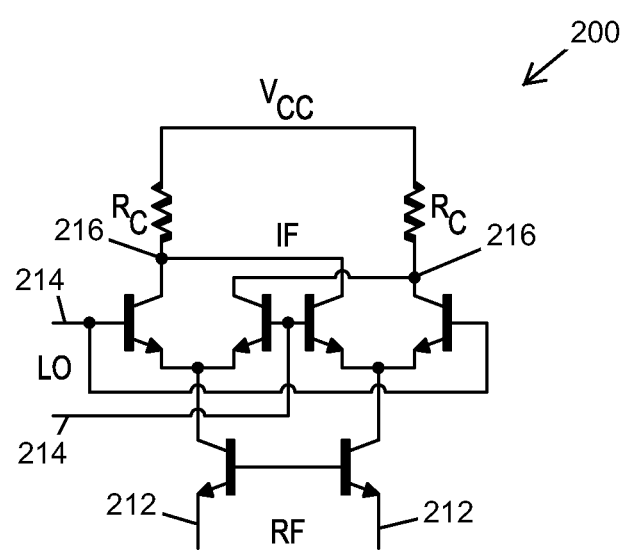

Claimed subject matter is particularly pointed out and distinctly claimed in the concluding portion of the specification. Such subject matter may, however, be understood by reference to the following detailed description when read with the accompanying drawings in which:

FIG. 1 is a block diagram of a radio-frequency identification (RFID) interrogator in accordance with one or more embodiments; and FIG. 2 is a mixer circuit for a receiver of a radio-frequency identification (RFID) interrogator in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled may, however, also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. "Over may, however, also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a block diagram of a radio-frequency identification (RFID) interrogator in accordance with one or more embodiments will be discussed. As shown in FIG. 1, RFID interrogator 100 generally may comprise a baseband processor and media access controller (MAC) 110 coupled to an RF transceiver 112 having a transmitter path and a receiver path. In one or more embodiments, baseband processor and media access controller 110 may comprise two or more discrete components or integrated circuits, and/or may comprise a single integrated circuit or processor, although the scope of the claimed subject matter is not limited in these respects. In one or more embodiments, baseband processor and MAC 110 may generate an interrogation waveform that is transmitted by RF transceiver 112 via antenna 114 as an interrogation signal 118. Interrogation signal 118 may be received by RFID tag 116 and may provide operational power to RFID tag 116 so that RFID tag 116 may transmit a tag response signal 120 back to RFID interrogator 100. The received tag response signal 120 may be demodulated and/or decoded by baseband processor and MAC 110 in order to determine information stored in tag 116, for example, an identification code corresponding to tag 116. This, however, is merely one example of the operation of RFID interrogator 100, and the scope of the claimed subject matter is not limited in this respect.

Referring now to FIG. 2, a mixer circuit for a receiver of a radio-frequency identification (RFID) interrogator in accordance with one or more embodiments will be discussed. As shown in FIG. 2, mixer circuit 200 may be utilized in the receiver section of RF transceiver 112 of FIG. 1. In one or more embodiments, the receiver section uses a direct conversion architecture. The RF signal received by the receiver may be applied to differential inputs 212 of mixer 200. Although mixer 200 of FIG. 2 is a differential mixer, in one or more embodiments mixer 200 may comprise a single-ended mixer, and the scope of the claimed subject matter is not limited in this respect. The received RF signal may include a self-jammer signal received at antenna 114 and applied to differential inputs 212. The local oscillator (LO) signal of RF transceiver 112 may be applied to differential inputs 214 of mixer circuit 200. The signal received from tag 116 may be mixed with the LO signal to result in an intermediate-frequency (IF) signal at differential outputs 216 of mixer circuit 200. In one or more embodiments, the self-jammer signal received at antenna 114 and applied to differential inputs 212 mixes with the LO signal applied to the mixer circuit, converting the self-jammer signal to a direct current (dc) signal. The self-jammer signal will convert to dc because the LO signal and the transmitted signal, from which the self-jammer signal is derived, come from the same oscillator. The amount of dc generated is directly proportional to the power of the self-jammer. The self-jammer is generated from the signal transmitted by RF interrogator 100, which may be approximately 1 watt, or 30 dBm. Typically, the circuitry of RF transceiver 112 may achieve approximately 30 dB of signal separation between the transmitter section and the receiver section, and the signal received from tag 116 may be approximately −80 dBm to −90 dBm. The self-jammer signal may, however, be on the order of 0 dBm and thus may be much greater than the power of the received signal from tag 116, by 80 dB or more. In order to tolerate such large self-jammer, rail voltage (Vcc) of mixer circuit 200 may be set to +5 V to enable the larger dc component resulting from the self-jammer signal to generate across the mixer load resistors (Rc). In one or more embodiments, mixer circuit 200 may operate at a rail voltage of about +5 V when RFID interrogator 100 comprises a fixed device that operates, for example, from a wall power receptacle. For RFID interrogators 100 that operate at lower transmit output power, for example, in a hand-held, portable mode operating from battery power, the power of the transmitted signal may be lower, and as a result the power of the self-jammer signal may also be lower. In such a lower-power mode, mixer circuit 200 may operate with a rail voltage of approximately +3 V, as the down-converted dc component from the self-jammer signal will be much smaller, proportional to its power at antenna 114.

In one or more embodiments, mixer circuit 200 may be disposed on a single integrated circuit or chip, along with RF transceiver 112. Mixer circuit 200 allows RF transceiver 112 to trade-off jammer tolerance against supply voltage. In applications which require less tolerance for the self-jammer, mixer circuit 200 may operate with a +3 V supply instead of the +5 V supply as needed. In one or more embodiments, a single integrated circuit on which mixer circuit 200 and RF transceiver 112 are disposed may include at least two power supply voltages to mixer circuit 200, and the power supply voltage may be selected based at least in part on the mode of operation of RFID interrogator 100, for example, based on the amount of tolerance for the self-jammer signal. In one or more embodiments, the power supply voltage applied to mixer circuit 200 may be variable. Thus, the power supply voltage of mixer circuit 200 may be selected based at least in part on the expected power level of the self-jammer signal. In such embodiments, a single integrated circuit for RF transceiver 112 may be utilized in several applications from higher end fixed readers to lower end embedded readers that fit into handheld devices, cell phones, and/or other embedded applications. As a result, a portable, hand-held type of RFID interrogator 100 does not require a higher power supply voltage (Vcc) for mixer circuit 200 in order to tolerate the power of the self-jammer signal. If the power of the self-jammer signal is lower, then mixer circuit 200 may operate at a lower power supply voltage, and as a result the power consumption of such an RFID interrogator 100 may be reduced by enabling operation at such lower voltages. The scope of the claimed subject matter, however, is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to voltage tuned variable jammer tolerance and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An RF transceiver for an RFID interrogator or the like, comprising:
    a transmitter circuit; and
    a receiver circuit, the receiver circuit comprising a mixer circuit, the mixer circuit being capable of receiving an RF signal at a first input and a local oscillator signal at a second input to mix the RF signal and the local oscillator signal at an output;
    wherein the mixer circuit operates at a power supply voltage selected based at least in part on a power level of a self-jammer signal transmitted by the transmitter circuit and received at the receiver circuit.

2. An RF transceiver as claimed in claim 1, wherein the mixer circuit operates at a higher power supply voltage if the expected power level of the self-jammer signal is higher, and operates at a lower power supply voltage if the expected power level of the self-jammer signal is lower.

3. An RF transceiver as claimed in claim 1, wherein the mixer circuit operates at a power supply of about 5 volts if the expected power level of the self-jammer signal is higher, and operates at a power supply of about 3 volts if the expected power level of the self-jammer signal is lower.

4. An RF transceiver as claimed in claim 1, wherein the transmitter and the receiver are disposed on a single integrated circuit.

5. An RF transceiver as claimed in claim 1, wherein the mixer circuit operates at a higher power supply voltage for a fixed mode of operation, and operates at a lower power supply voltage for a portable mode of operation.

6. An RF transceiver as claimed in claim 1, wherein the mixer circuit operates at a higher power supply voltage if the expected power level of the transmitter signal is about 30 dBm, and operates at a lower power supply voltage if the expected power level of the transmitter signal about 10 dBm.

7. An RF transceiver as claimed in claim 1, wherein the power supply voltage applied to the mixer circuit is selectable between two or more voltage levels.

8. An RF transceiver as claimed in claim 1, wherein the power supply voltage applied to the mixer circuit is selectable as a variable voltage level.

9. A method, comprising:
    transmitting a signal to interrogate an RFID tag;
    receiving a self-jammer signal during said transmitting, the self-jammer signal being based at least in part on the transmitted signal;
    mixing the self-jammer signal with a local oscillator signal; and
    selecting operation of said mixing at a power supply voltage selected based at least in part on a power level of the self-jammer signal.

10. A method as claimed in claim 9, said selecting comprising operating at a higher power supply voltage if the expected power level of the self-jammer signal is higher, and operating at a lower power supply voltage if the expected power level of the self-jammer signal is lower.

11. A method as claimed in claim 9, said selecting comprising operating at a power supply of about 5 volts if the expected power level of the self-jammer signal is higher, and operating at a power supply of about 3 volts if the expected power level of the self-jammer signal is lower.

12. A method as claimed in claim 9, said selecting comprising operating at a higher power supply voltage for a fixed mode of operation, and operating at a lower power supply voltage for a portable mode of operation.

13. A method as claimed in claim 9, said selecting comprising operating at a higher power supply voltage if the expected power level of the transmitter signal is about 30 dBm, and operating at a lower power supply voltage if the expected power level of the transmitter signal about 10 dBm.

14. A method as claimed in claim 9, said selecting comprising selecting between two or more voltage levels.

15. A method as claimed in claim 9, said selecting comprising selecting a variable voltage level.

16. An RF transceiver for an RFID interrogator or the like, comprising:
 a transmitter circuit; and
 a receiver circuit comprising a mixer circuit, the mixer circuit being capable of receiving an RF signal at a first input and a local oscillator signal at a second input and mixing the RF signal and the local oscillator signal at an output of the mixer circuit, the mixer circuit being further capable of receiving a self-jammer signal transmitted by the transmitter circuit and generating at the output of the mixer circuit a direct current (DC) voltage that is directly proportional to a power of the self-jammer circuit, a power supply voltage for the mixer circuit being selectable based on the DC voltage output generated by the mixer circuit for the self-jammer signal.

17. An RF transceiver according to claim 16, wherein the power supply voltage comprises a first voltage level if an expected power level of the self-jammer signal is a first power level, and wherein the power supply voltage comprises a second voltage level if the expected power level of the self-jammer signal is a second power level, the first power level being greater than the second power level, and the first voltage level being greater than the second voltage level.

18. An RF transceiver according to claim 17, wherein the first voltage level is about 5 Volts if the first power level is about 30 dBm, and the second voltage level is about 3 Volts if the second power level is about 10 dBm.

19. An RF transceiver according to claim 17, wherein the mixer circuit operates at the first voltage level for a fixed mode of operation, and operates at the second voltage level for a portable mode of operation.

20. An RF transceiver according to claim 16, wherein the transmitter and the receiver are disposed on a single integrated circuit.

\* \* \* \* \*